United States Patent [19]

Knoblich et al.

[11] Patent Number: 5,632,342

[45] Date of Patent: May 27, 1997

[54] LAWN SEEDER

[76] Inventors: Bryan N. Knoblich; Joann Valerani-Knoblich, both of 1917 E. Alaska St., Tucson, Ariz. 85706

[21] Appl. No.: 500,636

[22] Filed: Jul. 11, 1995

[51] Int. Cl.$^6$ .................................................. A01B 45/02
[52] U.S. Cl. ........................... 172/21; 172/349; 111/91; 239/689; 239/684
[58] Field of Search .................. 172/21, 349; 111/90, 111/91, 89, 11; 239/665, 684, 685, 689, 681; 222/627, 625

[56] References Cited

U.S. PATENT DOCUMENTS

| | | | |
|---|---|---|---|
| 29,691 | 8/1860 | Hariman | 111/90 |
| 43,181 | 6/1864 | Chesney | 111/90 |
| 465,072 | 12/1891 | Cahill | 111/11 |
| 649,257 | 5/1900 | Park | 111/90 |
| 1,887,334 | 11/1932 | Spaeth | 172/21 X |
| 1,898,214 | 2/1933 | Richards | 111/128 X |
| 1,914,915 | 6/1933 | Handler | 111/89 |
| 2,229,497 | 1/1941 | Dontje | 172/21 |
| 2,866,422 | 12/1958 | Colson | 111/128 |
| 2,966,218 | 12/1960 | Johnson | 172/21 X |
| 2,975,735 | 3/1961 | Purvance | 172/21 |
| 3,528,508 | 9/1970 | Stevenson | 172/21 X |
| 4,109,865 | 8/1978 | Hurtado T | 111/128 X |
| 4,164,190 | 8/1979 | Newman | 111/89 X |
| 4,192,387 | 3/1980 | Stinson | 172/21 |
| 4,402,438 | 9/1983 | Gregory et al. | 222/625 |
| 4,588,133 | 5/1986 | Brabb et al. | 239/681 |
| 4,609,151 | 9/1986 | Crowley | 239/656 |
| 4,926,768 | 5/1990 | Magda | 111/11 |
| 5,014,791 | 5/1991 | Kure | 172/21 |
| 5,178,078 | 1/1993 | Pendergrass | 111/128 |
| 5,184,559 | 2/1993 | Swanson | 111/11 |
| 5,353,724 | 10/1994 | Wheeley, Jr. | 172/21 X |
| 5,488,917 | 2/1996 | Santoli et al. | 172/21 X |

*Primary Examiner*—Dave W. Arola
*Assistant Examiner*—Victor Batson
*Attorney, Agent, or Firm*—Chase & Yakimo

[57] ABSTRACT

A lawn spreader composed of a cylindrical drum mounted to a user-operable handle assembly. Along the surface of a drum are a plurality of spaced-apart spike arrays with a plurality of aperture arrays interposed therebetween. A door at one end of the drum allows for deposit of granular materials, such as grass seed, within the drum. A paddle array within the drum is rotatable therein so as to open or close selected apertures of the aperture arrays. Upon drum rotation, as urged by the user on the handle assembly, the spikes first indent the earth with the grass seed then falling through the open apertures and into and between the resulting indentations in the earthen surface therebetween. The smooth surface of the drum then tamps the deposited seeds into the earthen surface. The spikes are preferably releasably attached to the cylindrical drum so that various types of spikes can be used.

13 Claims, 6 Drawing Sheets

5,632,342

LAWN SEEDER

BACKGROUND OF THE INVENTION

This invention relates to a lawn seeder and, more particularly, to a seeder which enhances the disbursement of grass seed and other granular materials onto a lawn.

Various devices have been proposed for the distribution of grass seed or the like onto an earthen surface. These devices include drop and broadcast spreaders which are either hand held or rolled along the lawn. Upon the user walking along the lawn area to be treated, the grass seed, fertilizer or other granular material is disbursed on the lawn.

It is desirable before utilizing such spreaders to aerate or verticut the lawn, i.e. place holes or grooves therein, so that the grass seed is deposited into these grooves. Also, it is desirable to subsequently roll or tamp the lawn subsequent to grass seed disbursement so as to tamp the grass seed into the earth.

Heretofore, separate devices were needed to aerate the lawns, disburse the grass seed and then tamp the lawn, the use of these devices requiring separate passes of the user over the lawn to be treated. Accordingly, the time, trouble and expense of treating the lawn are significantly increased. It is thus desirable to have a lawn maintenance device which can simultaneously perform these functions.

In response thereto we have invented a lawn seeder which utilizes a cylindrical drum having a plurality of spike arrays diagonally positioned thereon. A plurality of aperture arrays are positioned between the spike arrays. The number and size of the apertures are controlled by a user-operable paddle arm assembly mounted within the drum. One wall of the drum presents a door for deposit of the grass seed within the drum. Upon a user pushing on a handle assembly rotatably mounted to the drum, the resulting drum rotation causes the spike arrays to penetrate the lawn and indent the same. Subsequently, the grass seed falls through the apertures onto the lawn. The smooth surface of the drum between the aperture and spike arrays tamps the grass seed into the earthen surface. Accordingly, the steps of lawn aerating, seeding and tamping are easily performed.

It is therefore a general object of this invention to provide a lawn seeder.

Another general object of this invention is to provide a lawn seeder which presents a drum for rolling movement along the lawn.

Still a further object of this invention is to provide a lawn seeder, as aforesaid, which aerates the lawn during the rolling movement.

A further object of this invention is to provide a lawn seeder, as aforesaid, which deposits the lawn seed onto the ground subsequent to ground aeration.

Another object of this invention is to provide a lawn seeder, as aforesaid, which tamps the disbursed seed into the ground.

Still another object of this invention is to provide a lawn seeder, as aforesaid, which presents a plurality of spike arrays having spikes releasably attached to the drum so as to provide lawn aeration.

Another object of this invention is to provide a lawn seeder, as aforesaid, having a plurality of aperture arrays between the spike arrays for seed disbursal therethrough.

A further object of this invention is to provide a lawn seeder, as aforesaid, having a paddle assembly therein, the position of the paddles regulating the number and/or size of the apertures so as to control the flow rate of the seed onto the ground.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
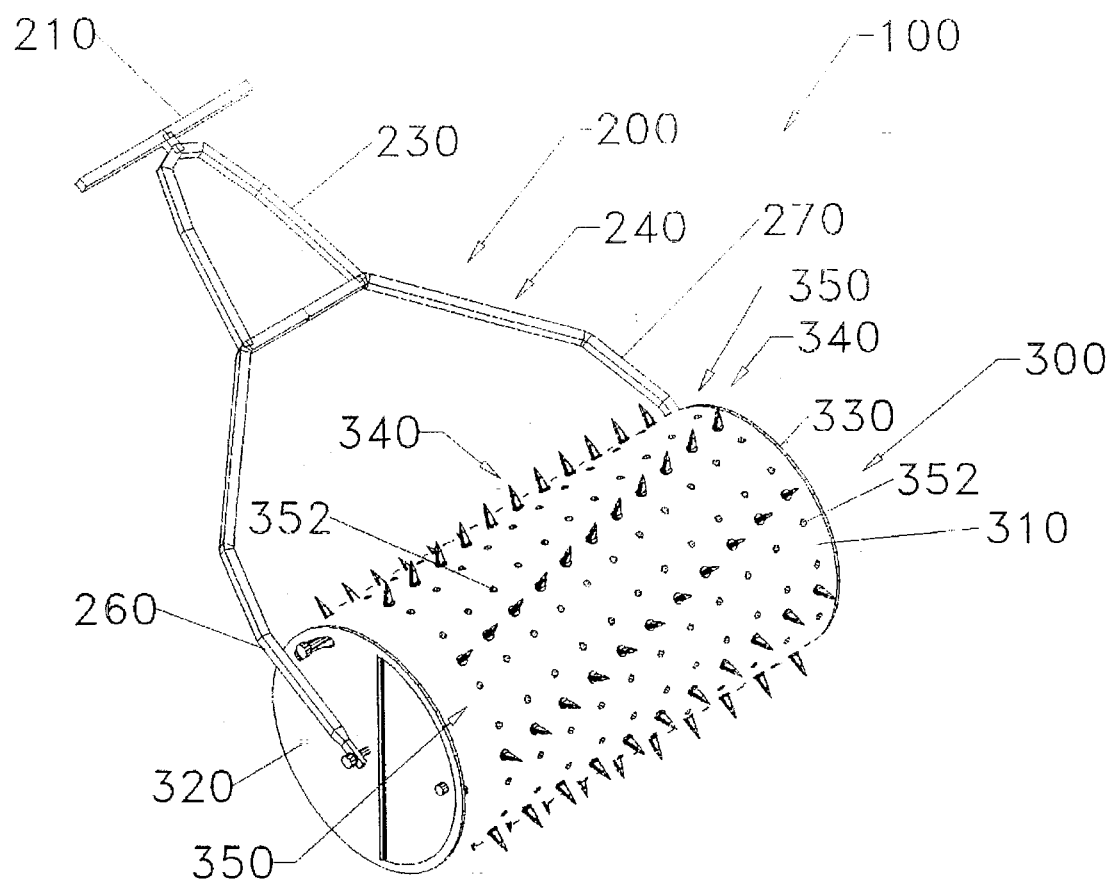
FIG. 1 is a perspective view of the lawn seeder.
Figure 2:
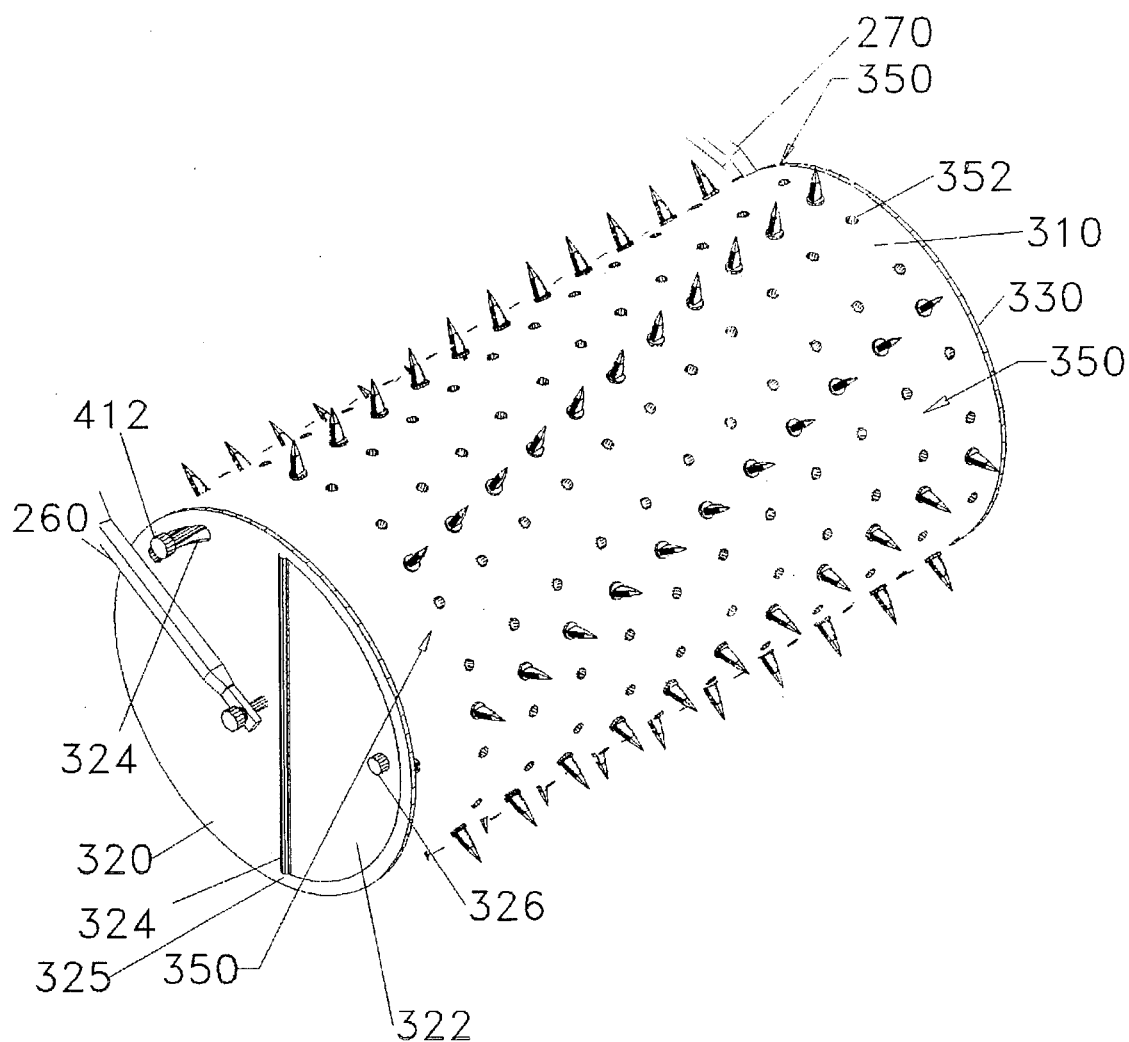
FIG. 2 is a perspective view of the drum assembly of the lawn seeder on an enlarged scale.
Figure 3:
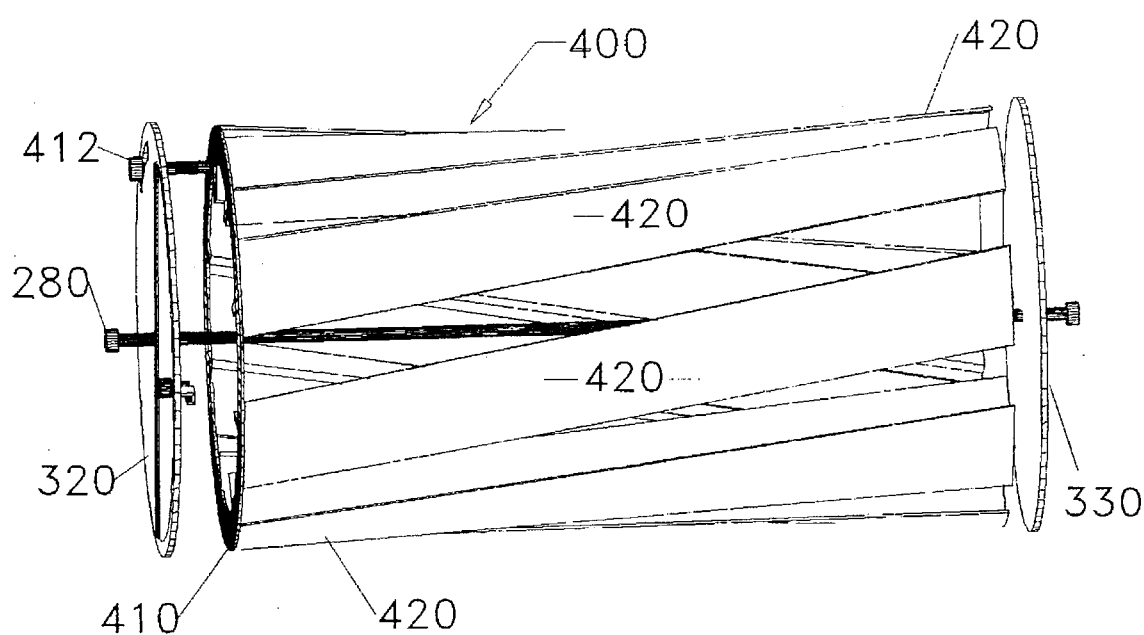
FIG. 3 is a front view showing the paddle assembly between the end walls of the cylindrical drum of the lawn seeder in an exploded view.
Figure 4:
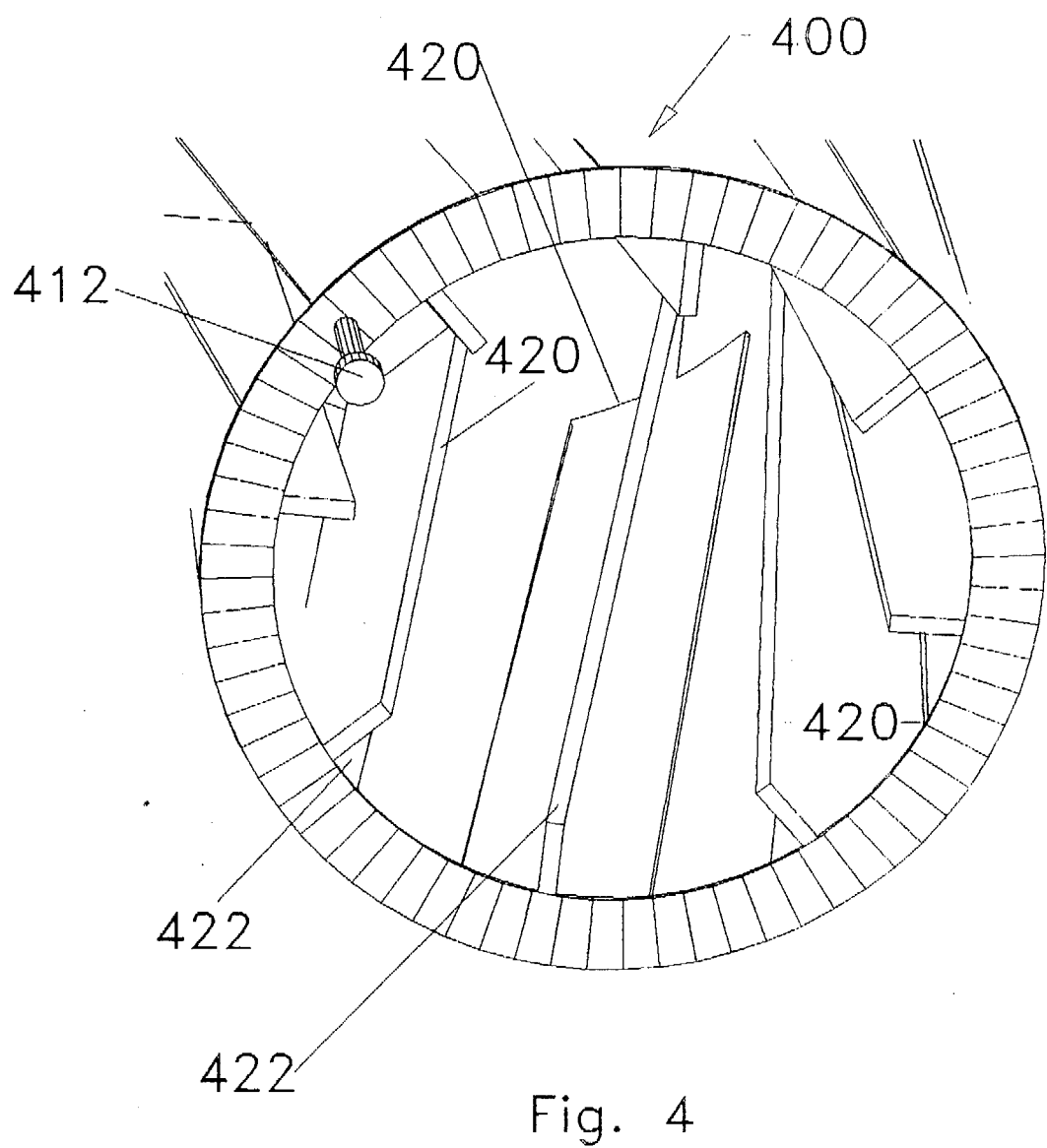
FIG. 4 is a view from one end of the paddle assembly showing the paddles therein.
Figure 5:
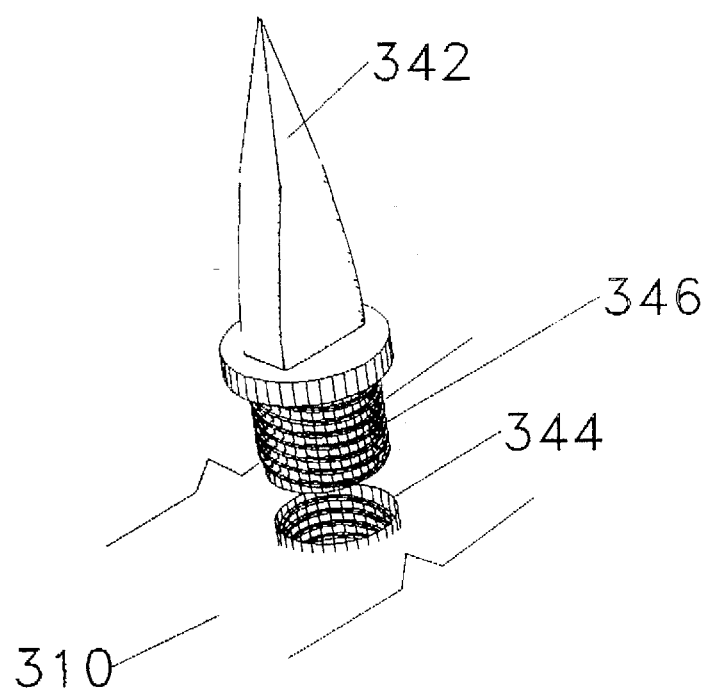
FIG. 5 is a perspective showing a spike for use on the lawn seeder as exploded from an underlying threaded spike aperture for engaging the threaded end of the releasable spike therein.
Figure 6:
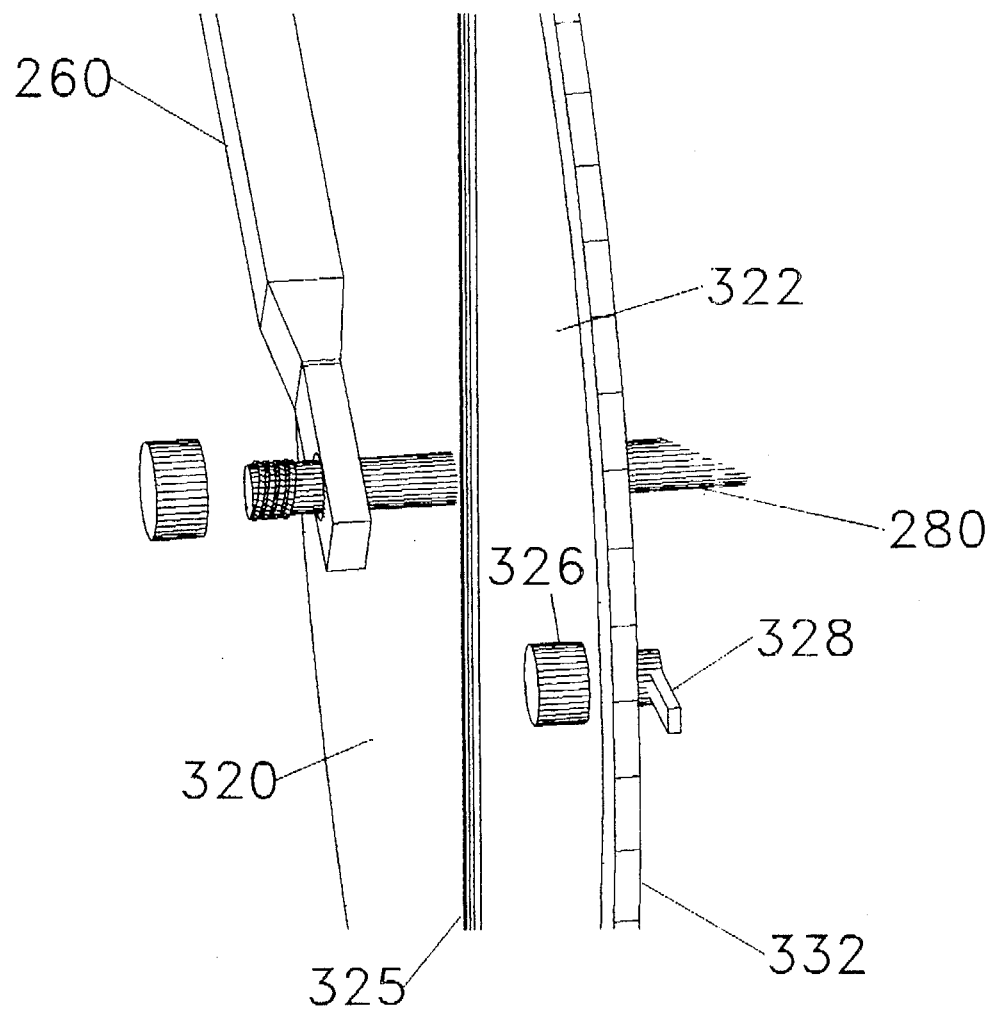
FIG. 6 is a fragmentary view showing the attachment of one arm of handle assembly to the drum axle as well as the door located in one end wall of the cylindrical drum.

Turning more particularly to the drawings, the seeder 100 is shown as generally comprising a handle assembly 200 connected to a rotatable drum assembly 300.

The drum assembly 300 comprises a cylindrical drum 310 preferably made of a sturdy metal, the drum having a pair of end walls 320, 330. Along the exterior surface of the drum 310 are a plurality of spaced-apart spike arrays 340 with aperture arrays 350 therebetween. Each spike array 340 comprises a row of spikes 342 diagonally extending between the end walls 320, 330 of drum 310 relative to the longitudinal drum axis. The spikes 342 may be releasably engageable with threaded apertures 344 located in the exterior surface of the drum 310. The spikes 342 may be of various configurations and/or lengths so as to facilitate various seeding and/or fertilizer application. (For example, a spike in the form of a blade edge may be used.)

Extending between the spike arrays 340 are aperture arrays 350. Each aperture array 350 presents first and second rows of apertures 352 extending between the exterior and interior of drum 310. The aperture arrays 350 diagonally extend between the end walls 320, 330 of the drum and parallel to the spike arrays 340.

Located within the drum assembly 300 is a paddle assembly 400. The paddle assembly 400 presents a plurality of diagonally extending paddles 420 attached to at least one mounting ring 410. Ring 410 has a diameter approaching the inside cross-sectional diameter of the drum 310. Extending from the ring 410 are a plurality of paddles 420, the paddles having a curvature conforming to the inside curved surface of the drum 310. Each paddle has a reinforcing rib 422 extending therealong. The paddles 420 diagonally extend from the ring 410 and towards the opposed end wall 330 of drum 310. The angle of extension of the paddles 420 between end walls 320, 330 is similar to the angle of extension of the aperture arrays 350 between the end walls 320, 330 of the drum 310. The ring 410 may be slidably mounted about the circumference of end wall 320 or mounted by a flush, slidable fit relative to the interior surface of the drum 310. Alternatively, ring 410 may be fitted within an annular groove extending about the interior surface of drum 310. The paddles 420 are positioned within the drum so as to contiguously overlie the aperture arrays 350.

Attached to the ring 410 is a lever 412 which extends through an arcuate slot 324 within the end wall 320 of drum 310. Movement of the lever 412 between the ends of the slot 324 rotates the ring 410 within drum 310 and the paddles 420 attached thereto. Thus, the degree of overlap of the paddles 420 with the underlying aperture arrays 350 can be regulated. Each paddle 420 can completely overlie the underlying array 350 or just one row of apertures 352 in the underlying array 350. Of course, the paddles 420 can be configured so that the paddle edges may partially cover the underlying apertures 352. The paddle 420/aperture array 350 relationship will control the amount of grass seed flowing through apertures 352.

Located within wall 320 is a door 322 swingably mounted to hinge 325. A rotatable knob 326 extends through door 322 and has a latch 328 at the end thereof. Upon rotation of the knob 326, the latch 328 will be free of the rim 332 of the side wall 330 allowing for the door 322 to be swung about hinge 325. Upon opening the door 322 the grass seed or other granular material may be deposited within the drum 310.

The drum assembly 300 is rotatably attached to the handle assembly 200. The handle assembly 200 comprises handle 210 connected to a first yoke 230 which in turn is connected to a larger yoke 240. At the free end of the yoke 240 are mounting arms 260, 270. Arms 260, 270 are connected to the ends of an axle 280 extending along the axis of drum 310 and through the end walls 320, 330 of the cylindrical drum 310. Accordingly, user exertion on handle 210 will rotate drum 310 about the axle 280.

In use the grass seed or other material is deposited in drum 310 through door 322. The degree of overlap of the paddles 420 of the paddle assembly with the underlying aperture array 350 is varied by movement of the lever 412 through slot 324. Upon user rotation of drum 310 spikes 342 of a ground-adjacent spike array 340 will pierce the lawn upon rolling contact. The seeds within the drum 310 will then fall through the apertures 352 of the following aperture array 350 as the aperture array 350 approaches the ground. The rate of seed disbursal depends on the degree of overlap of the paddle 420 with the apertures 352 of the underlying aperture array 350. Once deposited onto the ground, the exterior surface of the drum 310 will tamp the seeds into the ground. This tamping precludes the seeds from being blown away, washed away or devoured by birds, etc.

Accordingly, our spreader 100 provides a sequence of aerating, seeding and tamping functions which enhances disbursal of grass seed or the like onto the earth so as to enhance lawn growth.

It is to be understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A device for spreading a granular material on an earthen surface comprising:
   a drum having first and second end walls with an exterior surface spanning therebetween;
   a handle assembly;
   means for mounting said handle assembly to said drum;
   a plurality of protuberances extending from said exterior surface, said protuberances indenting the earthen surface upon rotatable movement of said drum along the earthen surface;
   a plurality of apertures on said exterior surface, said apertures communicating with a drum interior;
   means on said drum for deposit of the granular material into said interior of said drum;
   said drum rotatable upon user exertion on said handle assembly, the granular material in said drum interior for flow through said apertures onto the indentations made by said protuberances;
   means for regulating said material flow through said apertures comprising:
      a plurality of paddles extending between said end walls of said drum;
      means for mounting said paddles within said drum and adjacent said apertures between a first user selectable position with said paddles covering said apertures and a second position with said paddles uncovering said apertures, said paddles at said first position precluding said flow of the granular material through said apertures, said mounting means comprising:
         a ring rotatably mounted within said drum about an imaginary longitudinal axis of said drum, an end of each of said paddles connected to said ring;
         a lever attached to said ring;
         a slot in said drum with said lever extending therethrough, whereupon movement of said lever through said slot rotates said ring and said paddles attached therethrough between said first and second paddle positions.

2. The device as claimed in claim 1 wherein said plurality of apertures comprise:
   a plurality of spaced-apart aperture arrays on said drum exterior surface, each aperture array comprising at least one row of apertures extending between said end walls of said drum.

3. The device as claimed in claim 2 wherein each aperture array diagonally extends at an angle across said drum exterior surface relative to an imaginary longitudinal axis passing through said drum.

4. The device as claimed in claim 3 wherein said angle of extension of each array is equal to form a plurality of parallel aperture arrays about said drum exterior surface.

5. The device as claimed in claim 4 wherein said plurality of protuberances comprises a plurality of spaced-apart protuberance arrays positioned between said spaced-apart aperture arrays.

6. The device as claimed in claim 5 wherein said protuberances are spikes extending from said drum exterior surface.

7. The device as claimed in claim 6 further comprising means for releasably mounting said spikes to said drum exterior surface.

8. A device for spreading a granular material onto an earthen surface comprising:
   a drum having first and second end walls with an exterior surface spanning therebetween;
   a handle assembly;
   means for rotatably mounting said drum to said handle assembly;
   a plurality of spaced-apart protuberance arrays extending from said exterior surface and between said end walls, said protuberances in said arrays indenting said earthen surface upon contact therewith;
   a plurality of spaced-apart aperture arrays in said exterior surface, said aperture arrays positioned between said protuberance arrays;

an inlet in said drum for deposit of the material therein;

means within said drum for regulating the flow of the granular material through said apertures, said regulating means comprising:

a ring rotatably mounted within said drum;

a lever extending from said ring and having a free end extending through said drum, said lever being manipulated by a user to rotate said ring;

a plurality of paddles extending from said ring and along an interior surface of the drum, said paddles movable between a first position covering said aperture arrays and a second position uncovering said aperture arrays upon rotation of said ring;

said drum rotatable about said handle assembly upon user exertion thereon, the granular material falling through said uncovered aperture arrays for deposit onto the earthen surface.

9. The device as claimed in claim 8 wherein said protuberance arrays extend between said drum end walls at an angle relative to an imaginary longitudinal axis extending through said drum.

10. The device as claimed in claim 9 wherein said aperture arrays extend between said drum end walls at an angle relative to the imaginary longitudinal axis extending between said drum.

11. The device as claimed in claim 8 wherein each paddle is configured to lie contiguously adjacent said interior surface of said drum.

12. A device for spreading a granular material onto an earthen surface comprising:

a drum having first and second end walls with an exterior surface spanning therebetween;

a handle assembly;

means for rotatably mounting said drum to said handle assembly;

a plurality of aperture arrays in said exterior surface;

an inlet in said drum for deposit of the material therein;

means within said drum for regulating the flow of the granular material through said apertures, said regulating means comprises:

a ring rotatably mounted within said drum;

a lever extending from said ring and presenting a user-operable end, said lever end being manipulated by a user to rotate said ring;

a plurality of paddles extending from said ring and along an interior surface of the drum, said paddles movable between a first position covering said aperture arrays and a second position uncovering said aperture arrays upon rotation of said ring;

said drum rotatable about said handle assembly upon user exertion thereon, the granular material falling through said uncovered aperture arrays for deposit onto the earthen surface.

13. The device as claimed in claim 12 wherein said aperture arrays extend between said drum end walls at an angle relative to the imaginary longitudinal axis extending between said drum.

* * * * *